United States Patent
Williams

[15] 3,698,516
[45] Oct. 17, 1972

[54] CENTERING DEVICE
[72] Inventor: Winston F. Williams, Cedar Rapids, Iowa
[73] Assignee: Collins Radio Company, Cedar Rapids, Iowa
[22] Filed: July 14, 1971
[21] Appl. No.: 162,466

[52] U.S. Cl.................................185/39, 267/167
[51] Int. Cl..............................................F02g 1/02
[58] Field of Search ........................185/39; 267/167

[56] References Cited

UNITED STATES PATENTS 3,625,502   12/1971   Joerres.......................267/167
3,627,085   12/1971   Habuka....................185/37 X Primary Examiner—Edgar W. Geoghegan
Assistant Examiner—Allen M. Ostrager
Attorney—Richard W. Anderson et al.

[57] ABSTRACT

A low rate spring loading for a shaft axially rotatable in either direction from a defined home position is obtained by a spiral coiled spring loaded spool in combination with tension cable carried on the spool and circumferentially anchored to the shaft. Shaft rotation in either direction from home position imparts a proportional increase in loading from a selectable preload level at home position. A pivotable cable anchoring means carried by the shaft minimizes cable flexing at the anchor point as the shaft rotates through home position.

8 Claims, 4 Drawing Figures

PATENTED OCT 17 1972　　3,698,516

INVENTOR
WINSTON F. WILLIAMS

BY Richard W. Anderson
AGENT

CENTERING DEVICE

This invention relates generally to spring centering means and more particularly to a spring loading means by means of which a spring loaded home position is defined for a shaft bidirectionally rotatable about its own axis and which imparts a uniform increase in home position shaft rotation preload for equal increments of shaft rotation either direction from the defined home position.

Although finding particular usage in establishing a spring loaded home position for a motor shaft, where the motor is employed to servo position a load member by imparting bidirectional inputs about an unenergized home position in response to servo command signals applied to the system, the present invention is equally applicable to establish a selectably preloaded "home" position for any shaft or rotatable member.

Particularly, the present invention finds usage in establishing a spring loaded home position with preselectable spring preload for the shaft of a motor employed, for example, in a linear actuator mechanism, where the actuator mechanism might comprise a controllable length linkage in an overall control linkage system. Such systems are employed in aircraft control systems wherein a linear actuator member including a servo driven motor is employed as a variable length linkage arm in the rudder control system linkage between aircraft rudder pedals and the rudder surface or rudder hydraulic boost.

More particularly, dual series control systems employing linear actuators in series pairs in a control linkage are employed in aircraft automatic control systems as a redundant safety feature such that if should one such actuator member or its control system fail, the other of the actuators is available to maintain control.

In control linkage systems employing dual series linear actuators each of which is adjustable in length in accordance with the rotation of an associated servo drive motor, it is advantageous and ofttimes imperative that, should one or the other of the dual series linear actuator members fail in an extreme position thereof, that the actuator be caused to return automatically to a predetermined "home" position wherein the length of the actuator is nominally a predetermined length. The remaining one of the dual series linear actuators may then continue to normally operate about a center nominal position in a given design so as to provide bidirectional servo control in the system. Such a dual series linear actuator control system is defined in copending application entitled "Dual Series Fail-Operational Yaw Damper System" by Leo P. Kammerer, filed concurrently with the instant application and assigned to the assignee of the present invention.

Linear actuators ofttimes employ torque motors as the driving unit of the actuator. In such systems any spring loaded return to center feature is preferably established by a low rate spring loading such that the torque motor is not required to overcome an undue spring imposed force, and a low loading rate is preferably maintained over the extent of axial rotation of the motor from a defined system home position.

Accordingly, an object of the present invention is the provision of a simple return to center spring loading means for a bidirectionally rotatable shaft wherein a desired low rate spring loading feature may be realized in a minimum volumetric requirement implementation.

A still further object of the present invention is the provision of a spring centering means for a bidirectionally rotatable motor shaft by means of which a low rate loading is realized and which readily permits the introduction of a selectable preload on the motor shaft when said shaft is in home position.

The present invention is featured in the inclusion of a spiral coiled spring, such as a clock spring, in combination with a cable spool loaded by said spring and in cooperative engagement with the shaft of a motor to be rotatably center loaded at a home position.

The invention is further featured in means for anchoring tension imparting cable wound on said spring loaded spool to the motor shaft in a manner minimizing flexing of the cable means as the motor is continuously servo rotatably driven in either direction about a defined home position.

These and other objects and features of the present invention will become apparent upon reading the following description with reference to the accompanying drawings in which.

Figure 2:
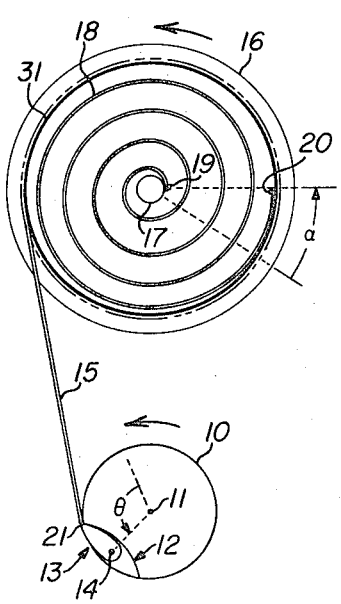
FIG. 2 is a further schematic functional diagram of the shaft of FIG. 1 rotated counterclockwise from the home position by a predetermined increment of rotation.
Figure 1:
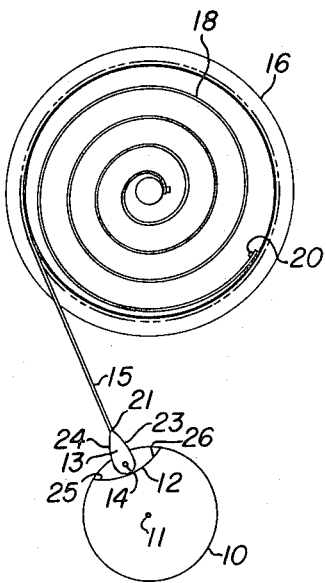
FIG. 1 is a functional diagram of a spring loaded shaft in accordance with the present invention illustrating the attainment of an adjustable preload with the shaft in "home" position.
Figure 3:
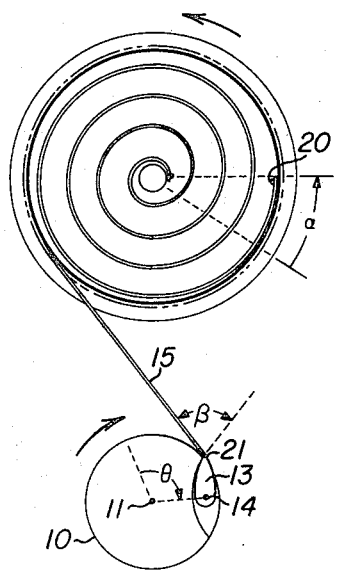
FIG. 3 is a functional diagram of the shaft of FIG. 1 rotated clockwise about its own axis from the home position by the same incremental rotation as that depicted in FIG. 2.

The present invention utilizes a spiral coiled spring member to provide a low rate loading feature with minimum volumetric requirement. With reference to FIG. 1, a spiral coiled spring 18 is contained within or otherwise cooperates with a spool member 16 such that counterclockwise rotation of the spool member 16 increases the loading imparted by the coiled spring 18. The inner end of the coiled spring is illustrated as being affixed by fastening means 19 to a fixed shaft 17 about which the spool member 16 is rotatable. The outer end of the coiled spring is fixed by fastening means 20 to the spool member 16. The spool member 16 is mounted in space separated relationship with respect to a bidirectionally rotatable shaft member 10. A length of cable 15 is carried around the spool member 16 and anchored to the spool 16. The free end of the cable 15 is affixed to one end 21 of an anchor member 13 on motor shaft 10. Member 13 is pivotally mounted about a pin axis 14 at a point radially displaced from the rotational axis 11 of the bidirectionally rotatable shaft 10. Anchor member 13 is receivable in a transverse arcuate groove 12 formed in the shaft member 10. Anchor member 13 is received within the groove 12 and pivotable about its pin axis 14 to first and second pivot extreme positions, which positions are illustrated respectively in FIGS. 2 and 3. The anchor member 13 may be formed with arcuate sides 23 and 24 such that when in either extreme pivot position, as illustrated in FIGS. 2 and 3, it conforms with the arcuate groove 12 formed in the shaft 10. As illustrated in the figures, the groove 12 has a radius substantially equal to the shaft member 10 radius and has a maximum depth such that the pivot pin axis 14 of the anchor member 13 lies at a point near the periphery of the shaft member. Groove 13 is thus formed with a maximum depth substantially less than the radius of shaft 10.

As illustrated in FIG. 1, the shaft 10 may be provided with a predetermined home angular position due to a preselected tension imparted on the anchor member 13 by cable 15. FIG. 1 thus illustrates a home position with the cable 15 lying essentially on a radial extension of the shaft member 10. Axial rotation of shaft 10 in either direction from the home position of FIG. 1 increases the loading imparted by coiled spring member 18 since a proportional counterclockwise "winding" is imparted to the spring loaded spool. FIG. 2 illustrates the shaft 10 rotated by an angle θ counterclockwise from the home position of FIG. 1, while FIG. 3 illustrates the shaft member 10 rotated by the same angle θ clockwise from the home position of FIG. 1. The shaft rotation angle θ, either clockwise or counterclockwise, results in a counterclockwise spool rotation angle α. In each case an increase in the home position preload is effected. Bidirectional rotation of shaft 10 from the home position of FIG. 1 results in increased tension on cable 15 as defined by the rate of coiled spring 18 for either direction of rotation.

The cable anchoring member 13 is advantageously employed so as to minimize the flexing of the cable 15 at its anchor point 21 as the shaft rotates through the preloaded home position. In accordance with a preferred embodiment of the present invention, the pivotable anchor member 13 is included so as to greatly minimize the flexure of the cable 15 at its point of anchor with the rotatable shaft 10. Were the end of cable 15 attached at a point on the periphery of shaft 10, bidirectional axial rotation of the shaft 10 about the spring loaded home position would constantly introduce extreme cable flexing at the point of attachment to the shaft 10. By attaching the end of the tension cable 15 to the free end 21 of a pivoted anchor member the anchor point between cable 15 and member 13 considerably reduces the maximum flexing angle of the cable at the point of attachment, as depicted by the angle β in FIG. 3. The extreme pivot point positions of the anchor member 13 tend to initiate laying of cable 15 on the shaft 10 when the cable is more nearly tangent to the circumference of the shaft 10. The flexure as concerns tension cable 15 at its point of anchor with the shaft is greatly minimized with the attendant advantage of increased mean time between failure.

Figure 4:
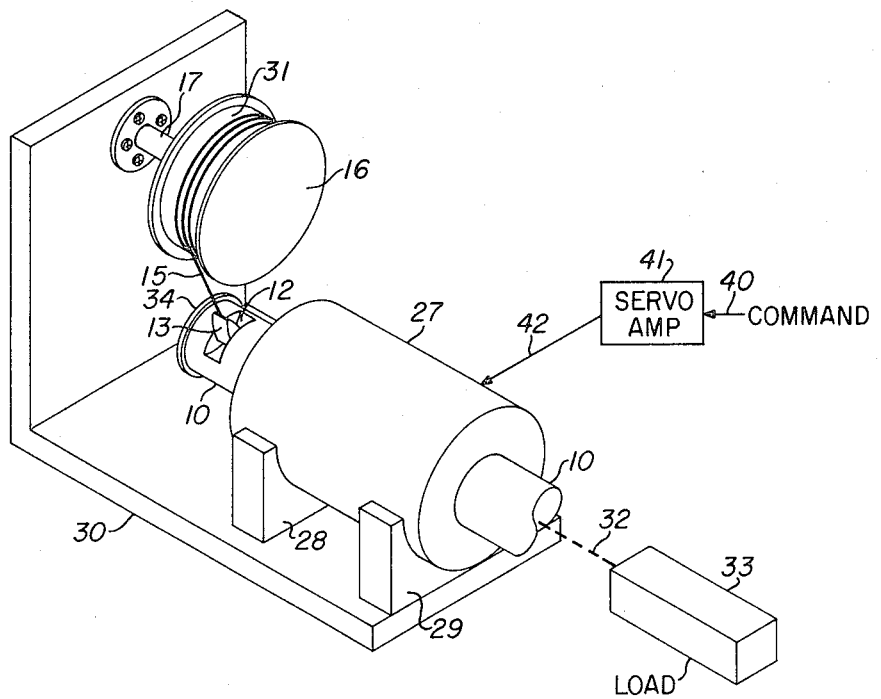
FIG. 4 is a functional mechanical embodiment of the present invention.

FIG. 4 illustrates a functional mechanical embodiment of a servo motor whose shaft is spring loaded to home preload position in accordance with the present invention.

With reference to FIG. 4 a servo actuator 27 is fixed mounted by means of mounting bases 28 and 29 to a mounting frame member 30. The spool member 16 is rotatably mounted on a shaft 17 which is affixed to the mounting frame 30 in parallel spaced relationship with respect to the rotational axis of the motor shaft 10. The motor shaft 10 is functionally indicated as being connected through mechanical linkage 32 to a load 33. A predetermined number of turns of cable 15 are stored on the spring loaded spool 16. Cable anchor member 13 is pivotally retained within the arcuate groove 13 formed transverse to the rotational axis of the motor shaft 10. As illustrated in FIG. 4, the system is in "home" position wherein the tension cable 15 lies along a radial extension of the motor shaft 10. In a typical system in which the spring loaded centering device of the present invention would be employed, the maximum number of revolutions of the motor shaft 10 in either direction from the illustrated home position would be predefined and the relative diameters of the motor shaft 10 and the spool 16 would define the necessary "storage" of tension cable 15 on the spool 16. The rotation of the motor shaft 10 by application of a drive signal 42 from servo amplifier 41 in response to command signal 40 effects a spring loaded winding of the spool member 16 in the same direction for either direction of motor rotation.

When the device of the present invention is embodied in a linear actuator, it is to be realized that the motor shaft 10 might have formed thereon or otherwise affixed thereto a lead screw member which cooperates with an internally threaded ram member constrained from rotation with respect to the case of the actuator 27, such that rotational increments of the shaft 10 effect a given axial translation of the ram member and thus define a selectively variable length of the linear actuator. In this application the home position illustrated for the motor shaft 10 in FIG. 4 would define a threaded engagement between the lead screw and the ram member midway between the ram position limits such that the ram member is equally displaceable in either direction from a defined "home" position. The tension imparted by the coiled spring member 18 would be chosen such, that for any given load, the torque applied to the motor shaft 10 by the spring loading would be sufficient to rotate the shaft 10 nominally to a predefined home position when the actuator 27 is unenergized.

Although the present invention has been described with respect to a particular embodiment thereof, it is not to be so limited as changes might be made therein which fall within the scope of the invention as defined in the appended claims.

I claim:

1. A centering device for spring loading a bidirectionally rotatable shaft to a predetermined home position, said shaft being rotatable with respect to a fixed mounting means, comprising a spiral coiled spring member, said spring member having the inner end thereof fixed with respect to said mounting means, a spool member rotatable about an axis parallel to and radially displaced from the longitudinal axis of said shaft, the other end of said spiral coiled spring being fixed to said spool member whereby a predetermined rotation of said spool member about said spool axis effects a predetermined low rate loading of said spiral coiled spring, cable means one end of which is affixed to said spool member, the other end of said cable means being affixed to a point on the periphery of said shaft, whereby axial rotation of said shaft from a predetermined home position defined by a selected preload force imparted by said spiral coiled spring effects a rotation of said spool member to effect an incremental increase in loading of said spiral coiled spring in proportion to the extent of rotation of said shaft from said home position.

2. A centering device as defined in claim 1 wherein said motor shaft is formed with a transversely extending groove extending radially inwardly from the circumference of said shaft, a pivotable anchor member one end of which is pinned within said transverse groove with the free end thereof being substantially juxtaposed with the circumference of said shaft when pivoted to first and second limit pivot positions thereof, the free end of said cable means being affixed to the other end of said pivotable anchor member, whereby a predetermined axial rotation of said shaft member from said home position effects a pivot of said anchor member with respect to the pin axis thereof and said anchor member in the pivot limit positions thereof effects a substantially tangential relationship between said cable and the periphery of said shaft member.

3. A centering device as defined in claim 2 wherein said groove is arcuate in form and has a maximum depth substantially less than the radius of said shaft; said pivotable anchor member being arcuately shaped so as to conform with said groove in the extreme pivot positions thereof.

4. A centering device as defined in claim 3 wherein the radius of said groove is substantially equal that of said shaft.

5. A centering device for spring loading a bidirectionally rotatable shaft to a predetermined home position, said shaft rotation being limited to a predetermined number of revolutions from said home position, said loading means comprising a spool means rotatable about an axis radially displaced from that of said motor shaft and parallel to that of said motor shaft, said spool means carrying thereon a predetermined number of turns of cable one end of which is anchored to said spool and the other end of which is affixed to the periphery of said motor shaft, spiral spring means, one end of said spiral spring means being affixed to said mounting means and the other end of said spiral spring means being affixed to said spool means.

6. A centering device as defined in claim 5 wherein said motor shaft is formed with a transversely extending groove extending radially inwardly from the circumference of said shaft, a pivotable anchor member one end of which is pinned within said transverse groove with the free end thereof being substantially juxtaposed with the circumference of said shaft when pivoted to first and second limit pivot positions thereof, the free end of said cable means being affixed to the other end of said pivotable anchor member, whereby a predetermined rotation of said shaft member from said home position effects a pivot of said anchor member with respect to the pin axis thereof and said anchor member in the pivot limit positions thereof effects a substantially tangential relationship between said cable and periphery of said shaft.

7. A centering device as defined in claim 6 wherein said groove is arcuate in form and has a maximum depth substantially less than the radius of said shaft; said pivotable anchor member being arcuately shaped so as to conform with said groove in the extreme pivot positions thereof.

8. A centering device as defined in claim 7 wherein the radius of said groove is substantially equal that of said shaft.

* * * * *